(12) United States Patent
Itzhaky et al.

(10) Patent No.: US 10,368,505 B2
(45) Date of Patent: Aug. 6, 2019

(54) SYSTEM AND METHOD FOR IMAGE-BASED DETERMINATION OF IRRIGATION SYSTEM DISPERSAL ROUTES

(71) Applicant: Prospera Technologies, Ltd., Tel-Aviv (IL)

(72) Inventors: Raviv Itzhaky, Maale Adumim (IL); Daniel Koppel, Raanana (IL); Simeon Shpiz, Bat Yam (IL)

(73) Assignee: Prospera Technologies, Ltd., Tel-Aviv (IL)

( * ) Notice: Subject to any disclaimer, the term of this patent is extended or adjusted under 35 U.S.C. 154(b) by 0 days.

(21) Appl. No.: 15/629,349

(22) Filed: Jun. 21, 2017

(65) Prior Publication Data

US 2017/0367276 A1 Dec. 28, 2017

Related U.S. Application Data

(60) Provisional application No. 62/353,092, filed on Jun. 22, 2016.

(51) Int. Cl.
*G06K 9/00* (2006.01)
*A01G 25/16* (2006.01)

(52) U.S. Cl.
CPC ......... *A01G 25/16* (2013.01); *G06K 9/00657* (2013.01); *G06K 2209/17* (2013.01)

(58) Field of Classification Search
None
See application file for complete search history.

(56) References Cited

U.S. PATENT DOCUMENTS

| 6,199,000 | B1 * | 3/2001 | Keller | A01B 79/005 701/50 |
| 6,928,339 | B2 | 8/2005 | Barker | |
| 8,437,498 | B2 * | 5/2013 | Malsam | A01G 25/16 239/71 |
| 2010/0032493 | A1 * | 2/2010 | Abts | A01G 25/092 239/11 |
| 2012/0284264 | A1 * | 11/2012 | Lankford | A01B 79/005 707/736 |
| 2017/0273258 | A1 * | 9/2017 | Itzhaky | A01G 25/167 |
| 2017/0367276 | A1 * | 12/2017 | Itzhaky | A01G 25/16 |

* cited by examiner

*Primary Examiner* — Tahmina N Ansari
(74) *Attorney, Agent, or Firm* — M&B IP Analysts, LLC

(57) ABSTRACT

A system and method for image-based irrigation system management. The method includes continuously obtaining sensor signals, wherein the sensor signals include at least one first image showing at least one crop; analyzing the obtained sensor signals, wherein the analysis includes performing machine vision on the at least one first image; determining, based on the analysis, at least one current crop identifier of the at least one crop; and determining, in real-time, a dispersal route for an irrigation system based on the at least one current crop identifier.

18 Claims, 3 Drawing Sheets

SYSTEM AND METHOD FOR IMAGE-BASED DETERMINATION OF IRRIGATION SYSTEM DISPERSAL ROUTES

CROSS-REFERENCE TO RELATED APPLICATIONS

This application claims the benefit of U.S. Provisional Application No. 62/353,092 filed on Jun. 22, 2016, the contents of which are hereby incorporated by reference.

TECHNICAL FIELD

The present disclosure relates generally to irrigation systems, and more particularly to controlling pivot irrigation systems.

BACKGROUND

Irrigation systems have been employed for many years to distribute water and fertilizer to areas in which crops are grown. A particular type of irrigation system, known as the pivot irrigation system, includes a central tower about which a rotatable arm pivots or rotates at an elevated position with respect to the ground. A conduit extends along the rotatable arm and radiates outwardly from the central tower. Water is sprayed or otherwise distributed from the conduit, typically at various points along the conduit.

In an existing implementation, the operation of the pivot irrigation system is based on the angular positions of the rotatable arm, which is often determined by a sensor disposed on or in the central tower and is configured to detect movements or angular positions of the rotatable arm relative to a reference angular position such as, for example, due north (i.e., 0 degrees from north). Thus, as the rotatable arm pivots and the angular position of the rotatable arm changes, different operations of the pivot irrigation system may be initiated, adjusted, or terminated.

Other existing implementations have attempted to utilize Global Positioning System (GPS) technology to determine the orientation of the rotatable arm using one or more GPS antenna/receiver units. However, such systems tend to be complex with respect to construction and implementation, particularly since existing GPS-based solutions also require determination of the angular orientation of the rotatable arm relative to a pre-programmed center pivot location. Specifically, some existing solutions involve constantly recalculating the current angular orientation, or azimuth, of the rotatable arm based on the coordinates of the central pivot location and the coordinates from a GPS receiver mounted on one of the towers, and comparing the current azimuth to a plurality of known azimuths associated with predetermined irrigation actions. Accordingly, such solutions do not readily lend themselves to remote monitoring or control of the irrigation system.

Further, existing solutions typically utilize monitoring and programming operations that must be performed or changed in the field rather than, e.g., from a central control location. Such location-situational programming may be inconvenient, particularly for operators that are responsible for managing multiple irrigation systems.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for image-based irrigation system management. The method comprises: continuously obtaining sensor signals, wherein the sensor signals include at least one first image showing at least one crop; analyzing the obtained sensor signals, wherein the analysis includes performing machine vision on the at least one first image; determining, based on the analysis, at least one current crop identifier of the at least one crop; and determining, in real-time, a dispersal route for an irrigation system based on the at least one current crop identifier.

Certain embodiments disclosed herein also include a non-transitory computer readable medium having stored thereon instructions for causing a processing circuitry to execute a process, the process comprising: continuously obtaining sensor signals, wherein the sensor signals include at least one first image showing at least one crop; analyzing the obtained sensor signals, wherein the analysis includes performing machine vision on the at least one first image; determining, based on the analysis, at least one current crop identifier of the at least one crop; and determining, in real-time, a dispersal route for an irrigation system based on the at least one current crop identifier.

Certain embodiments disclosed herein also include a system for image-based irrigation system management. The system comprises: a processing circuitry; and a memory, the memory containing instructions that, when executed by the processing circuitry, configure the system to: continuously obtaining sensor signals, wherein the sensor signals include at least one first image showing at least one crop; analyzing the obtained sensor signals, wherein the analysis includes performing machine vision on the at least one first image; determining, based on the analysis, at least one current crop identifier of the at least one crop; and determining, in real-time, a dispersal route for an irrigation system based on the at least one current crop identifier.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
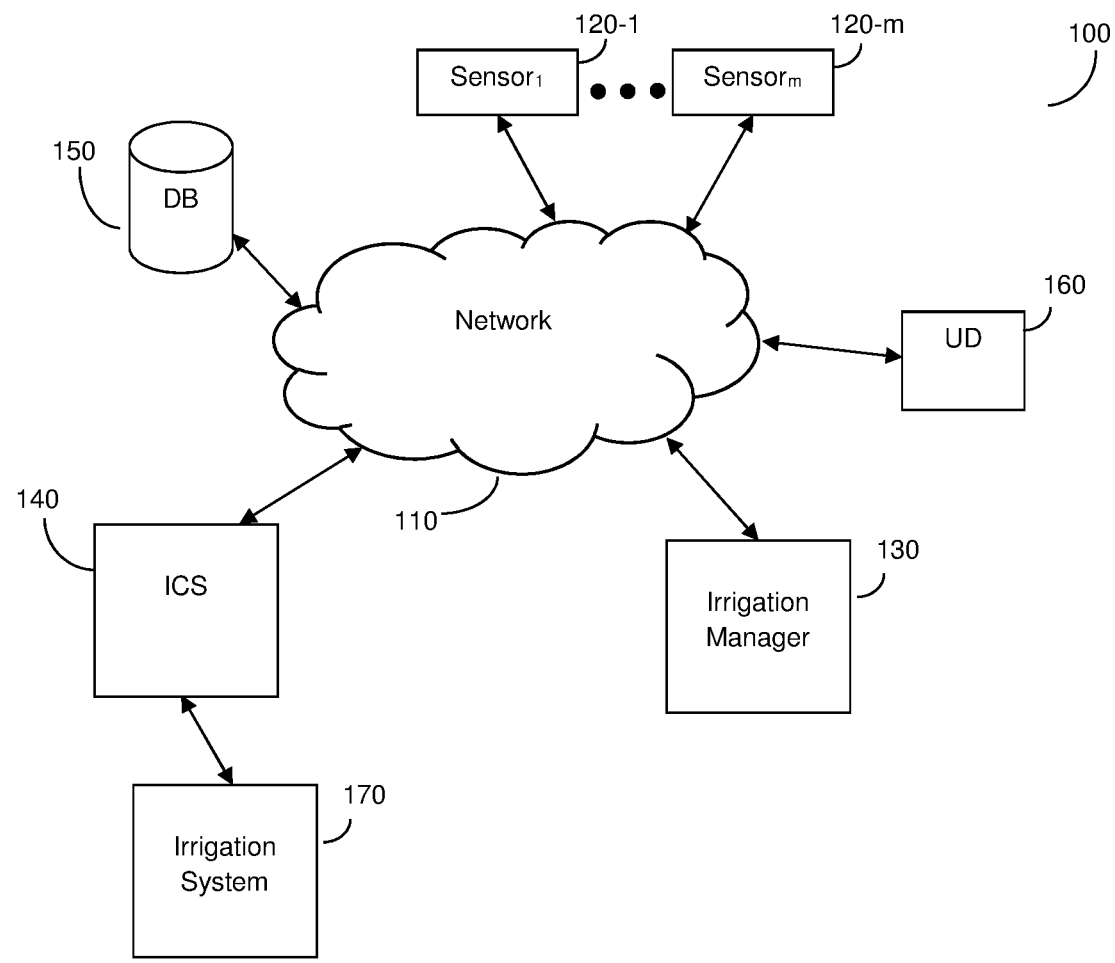
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for dynamic image-based irrigation system management. Input sensor signals captured by sensors deployed in proximity to at least one crop are continuously obtained. The input sensor signals include at least input images. The input sensor signals are analyzed. The analysis includes machine vision analysis of the input images. Based on the analysis, at least one crop identifier of the at least one crop is determined. The at least one crop identifier includes a crop type, a current crop state, or both.

A dispersal route is determined, in real-time, based on the current crop state. The dispersal route includes dispersal parameters for an irrigation system to irrigate the at least one crop such as, but not limited to, flow rates, compositions of irrigation materials to be dispersed to the at least one crop, portions of the irrigation system to disperse the irrigation compositions, a configuration of each dispersing portion of the irrigation system, and the like. Configuration instructions for configuring the irrigation system to apply the dispersal route are provided to an irrigation control system connected to the irrigation system.

In some embodiments, the steps for determining dispersal routes may be performed repeatedly at predetermined time intervals or when a sensor signal change event is detected (e.g., when a previously unidentified indicator of disease or other known undesirable crop state is identified in images of the at least one crop), thereby allowing for applying dispersal routes that vary over time in accordance with the real-time growing needs of the at least one crop.

Various embodiments described herein are discussed with respect to managing irrigation for at least one crop in a farm area. It should be noted that the at least one crop includes any crops to be irrigated and may include, but is not limited to, at least one plant, at least one portion of a plant, and the like. It should also be noted that the farm area is any area in which the at least one crop grows, and may include, but is not limited to, soil in which the at least one crop is grown, environment surrounding the at least one crop (e.g., an airspace above the at least one crop), a combination thereof, and the like.

The disclosed embodiments may therefore be utilized for purposes such as, but not limited to, precision agriculture. Precision agriculture involves collection of real-time agricultural data to make irrigating and other decisions rather than, e.g., based on a predetermined schedule for predetermined crop conditions. To this end, precision agriculture allows for responding to variability in crops even within the same field, thereby allowing for optimized crop yield while minimizing materials needed to produce the yield. Accordingly, the disclosed embodiments may result in more efficient farming (e.g., with respect to cost, crop yield, maintenance, etc.) than manual observation and predetermined automated irrigation. As a non-limiting example, if soil of a first area is demonstrated to hold water better than soil of a second area (e.g., as indicated based on images showing the first area and the second area, respectively), crops may be planted more densely (i.e., more plants per square unit of area) in the first area than in the second area, an amount of water supplied to the first area may be less than an amount of water supplied to the second area, or both, while maintaining an approximately equal or greater crop yield of the first area as compared to the second area.

FIG. 1 shows an example network diagram 100 utilized to describe the various disclosed embodiments. The example network diagram 100 includes a plurality of sensors 120-1 through 120-*m* (hereinafter referred to collectively as sensors 120 and individually as a sensor 120, merely for simplicity purposes), an irrigation manager 130, an irrigation control system (ICS) 140, and a database (DB) 150 communicatively connected via a network 110. In an optional embodiment, a user device (UD) 160 may be further communicatively connected to the network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The sensors 120 include at least one visual-based sensor such as, but not limited to, a still camera, a thermal camera, a red-green-blue (RGB) camera, a three-dimensional camera, a multi-spectral camera, a hyper spectral camera, a video camera, a Light Detection and Ranging (LIDAR) sensor, a spectral reflectance sensor, and the like. The sensors 120 may further include sensors for detecting other environmental features related to the irrigation system 170, at least one crop irrigated by the irrigation system 170, or both, and may include, but are not limited to, a movement sensor, a temperature sensor, an insect detector, a global positioning system (GPS) sensor, a compass, and the like. Each of the sensors 120 may be stationary, mobile, or affixed to a mobile unit. The sensor signals may further be associated with time data indicating a time of capture of each sensor signal. The sensors 120 are deployed at least in proximity to the at least one crop (e.g., within a predetermined threshold distance of one or more of the at least one crop), and may further be in direct contact with at least a portion of the at least one crop (e.g., physically touching a stem of a plant).

The irrigation control system 140 is communicatively connected to an irrigation system 170, thereby allowing the irrigation control system 140 to cause irrigation of a farm area including at least one crop via the irrigation system 170. The irrigation system 170 may be a central pivot irrigation system or a linear irrigation system. The central pivot irrigation system includes, but is not limited to, rotating arms including sprinklers that are located around a pivot configured to irrigate the at least one crop via sprinklers. The irrigation system 170 may include, but is not limited to, one or more irrigation devices (e.g., sprinklers, irrigation channels, spraying vehicles, drones, etc.) and is deployed in proximity to the at least one crop, thereby allowing the irrigation control system 140 to control irrigation of the at least one crop based on instructions received from the irrigation manager 130.

The irrigation control system 140 may be deployed remotely from the at least one crop and configured to control the irrigation system 170, thereby allowing the irrigation control system 140 to indirectly cause irrigation of the at least one crop. Alternatively, the irrigation control system 140 may include or be connected to the irrigation system 170, thereby allowing the irrigation control system 140 to directly cause irrigation of the at least one crop. It should be noted that the irrigation system 170 may be configured to provide irrigation compositions including different amounts of water, different types of water (e.g., water treated with different chemicals or having different purities), other fluids, fertilizers, combinations thereof, and the like, as needed for crop development.

The database 150 has stored therein data utilized for determining configuration instructions for dispersal by the irrigation system 170. The data utilized for determining dispersal instructions may include, but is not limited to, predetermined sensor signals and associated known crop identifiers (e.g., images showing crop states associated with the corresponding states shown therein, images showing different types of crops, combinations thereof, etc.), configuration instructions utilized for configuring the irrigation system 170, irrigation compositions to be applied to different crop states, and the like. The configuration instructions include at least instructions for configuring the irrigation system 170 according to a dispersal route for irrigating the at least one crop. The dispersal route defines at least one configuration of the irrigation system 170 or at least one portion thereof. Each irrigation composition may include water, at least one type of fertilizer, or a combination thereof.

In an embodiment, the irrigation manager 130 is configured to continuously receive input sensor signals from the sensors 120. The input sensor signals include at least visual signals such as images, and may further include signals related to environmental parameters of the environment in which the at least one crop is located as described herein above. In a further embodiment, the irrigation manager 130 may be configured to retrieve (e.g., from the database 150) data related to the at least one crop. The data may include, but is not limited to, soil data, types of plants of the at least one crop, and the like. The soil data may include, but is not limited to, soil type, texture, electrical conductivity, water holding capacity, and the like.

In an embodiment, the irrigation manager 130 is configured to analyze, in real-time, the input sensor signals captured by the sensors 120 to determine at least one crop identifier of the at least one crop. The at least one crop identifier may include, but is not limited to, a type of the at least one crop, a current state of each of the at least one crop, or both. In a further embodiment, the analysis includes, but is not limited to, comparing the input images to predetermined reference images associated with known crop identifiers. To this end, in an embodiment, the analysis may include machine vision analysis to identify features of images of the sensor signals captured by the sensors 120.

In a further embodiment, the analysis further includes comparing results of the machine vision analysis of the images to results of machine vision analysis of reference images showing known types and states of crops (e.g., images stored in the database 150). Each of the reference images may be associated with at least one crop identifier utilized for determining a dispersal route that is suitable for treating the at least one crop in the current crop state shown in the images captured by the sensors 120. The at least one crop identifier may include, but is not limited to, a crop type (e.g., whether the crop is a tomato plant or a cucumber plant), a current crop state (e.g., whether the crop is ready for harvesting, a disease or other abnormality of the crop, a normal state, etc.), or a combination thereof. As a non-limiting example, when images captured by the sensors 120 feature corn plants showing signs of blight (e.g., featuring visual characteristics matching visual characteristics shown in reference images stored in the database 150 that are associated with blight of corn crops), a dispersal route including at least an amount and composition of irrigation material that is suitable for treating blight in corn crops may be determined.

In an embodiment, based on the at least one crop identifier, the irrigation manager 130 is configured to determine, in real-time, a dispersal route for irrigating the at least one crop. The dispersal route includes dispersal parameters such as, but not limited to, flow rates, compositions of irrigation materials to be dispersed to the at least one crop, portions of the irrigation system 170 to disperse the irrigation compositions, a configuration of each dispersing portion of the irrigation system, and the like. To this end, in a further embodiment, the irrigation manager 130 is configured to retrieve, from the database 150, at least a portion of the dispersal route based on the type, current crop state, or both. It should be further noted that different portions of the irrigation system 170 may be configured differently. For example, portions having separate motion capabilities may be configured differently.

In another embodiment, the dispersal route may be determined based further on environmental parameters related to, e.g., the farm area in which the at least one crop is grown. To this end, in an embodiment, the irrigation manager 130 is configured to compare the at least one crop identifier and the at least one environmental parameter related to the at least one crop to a plurality of sets of predetermined parameters associated with known dispersal routes for irrigating crops. In a further embodiment, the irrigation manager 130 may be configured to compute a matching score for each known dispersal route, where a dispersal route with the highest matching score is determined for irrigating the at least one crop. If there is a tie (i.e. if two or more known dispersal routes have the highest matching score), the determined dispersal route may be, e.g., a most used dispersal route or a dispersal route selected by a user (e.g., a user of the user device 160).

In an embodiment, the irrigation manager 130 is configured to cause the irrigation control system 140 to irrigate the at least one crop. In a further embodiment, the irrigation manager 130 is configured to send instructions for implementing the determined dispersal route to the irrigation control system 140, thereby configuring the irrigation control system 140.

The user device (UD) 160 may be, but is not limited to, a personal computer, a laptop, a tablet computer, a smartphone, a wearable computing device, or any other device capable of receiving and displaying visual representations of dispersal routes. In an embodiment, the irrigation manager 130 is configured to send the configuration instructions to the user device 160. In a further embodiment, the user device 160 is configured to display information of the dispersal routes and to send the configuration instructions to the irrigation control system 140 based on user inputs (e.g., a user input indicating approval of a dispersal route determined by the irrigation manager 130, user inputs indicating modifications to such a dispersal route, etc.).

In an embodiment, the analysis of the input sensor signals may be repeatedly performed by the irrigation manager 130. In a further embodiment, a new dispersal route may be sent in real-time, e.g., at predetermined time intervals, when a significant change in current crop state is detected (e.g., when a previously unidentified indicator of disease is identified in a current image showing the at least one crop), or both.

It should be noted that the embodiments described herein with respect to FIG. 1 are merely examples, and that the embodiments disclosed herein are not limited to the diagram shown in FIG. 1. In particular, multiple user devices or no user devices may be communicatively connected to the network to receive dispersal routes, configuration instructions, or both, without departing from the scope of the disclosure.

Additionally, in an embodiment, the irrigation control system 140 may be incorporated in the irrigation manager 130, thereby allowing the irrigation manager 130 to control irrigation operations based on the determined dispersal route. In a further embodiment, the irrigation manager 130 may be assembled on the irrigation system 170 deployed in the farm area.

It should be further noted that the sensors 120 may be incorporated in or directly connected to the irrigation manager 130, thereby allowing the irrigation manager 130 to capture the sensor signals.

Figure 2:
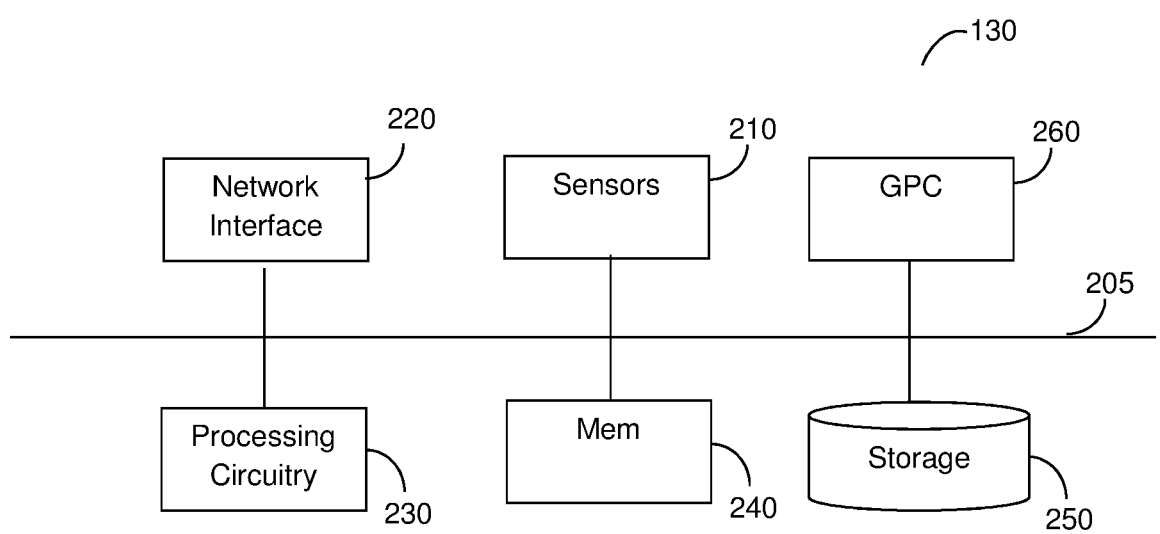
FIG. 2 is a schematic diagram for an irrigation manager according to an embodiment.

FIG. 2 is an example schematic diagram of the irrigation manager 130 according to an embodiment. The irrigation manager 130 includes a network interface 220, a processing circuitry 230 coupled to a memory (Mem) 240, and a storage 250. In an embodiment, the components of the irrigation manager 130 may be communicatively connected via a bus 205.

In an optional embodiment, the irrigation manager 130 may include one or more sensors 210. The sensors 210 may include, but are not limited to, visual sensors, sensors for detecting other environmental features, or both, as described further herein above.

The network interface 220 allows the irrigation manager 130 to communicate with the sensors 120, the irrigation control system 140, the database 150, the user device 160, or a combination of, for purpose such as, but not limited to, receiving sensor signals, sending dispersal instructions, retrieving data related to known crop identifiers (e.g., associated predetermined sensor signals, dispersal routes utilized for addressing particular crop states, etc.), combinations thereof, and the like.

The processing circuitry 230 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 240 may be volatile (e.g., RAM, etc.), non-volatile (e.g., ROM, flash memory, etc.), or a combination thereof. In another embodiment, the memory 240 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 230 to perform the various processes described herein. Specifically, the instructions, when executed, cause the processing circuitry 230 to dynamically provide dispersal instructions, as discussed hereinabove.

The storage 250 may be magnetic storage, optical storage, and the like, and may be realized, for example, as flash memory or other memory technology, CD-ROM, Digital Versatile Disks (DVDs), or any other medium which can be used to store the desired information. In one implementation, computer readable instructions to implement one or more embodiments disclosed herein may be stored in the storage 250. In another implementation, the storage 250 may store soil data for the farm area, data utilized to determine dispersal routes (e.g., irrigation recommendations associated with different crop states), both, and the like.

In an embodiment, the irrigation manager 130 may include a graphical processing circuitry (GPC) 260 configured to perform machine vision techniques on images or other visual sensor signals received from the sensors 120 or 210. The irrigation manager 130 may be configured to analyze the visual sensor signals to perform the embodiments described herein.

It should be understood that the embodiments described herein are not limited to the specific architecture illustrated in FIG. 2, and other architectures may be equally used without departing from the scope of the disclosed embodiments.

Figure 3:
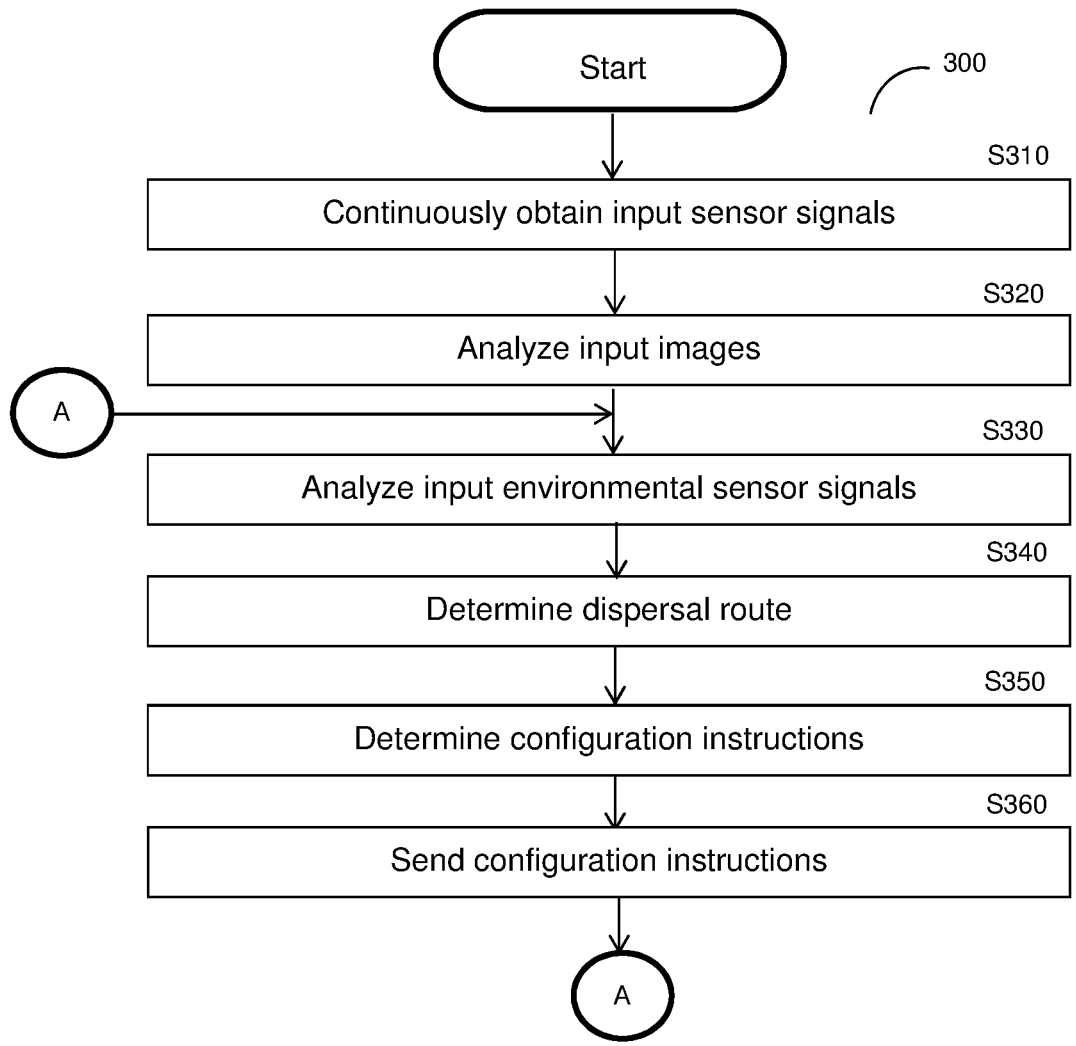
FIG. 3 is a flowchart illustrating a method for image-based irrigation system management according to an embodiment.

FIG. 3 is an example flowchart 300 illustrating a method for providing dispersal instructions for irrigating at least one crop to at least one pivot irrigation system based on sensor signals according to an embodiment. In an embodiment, the method is performed by the irrigation manager 130 with respect to the irrigation system 170.

At S310, input sensor signals captured by at least one sensor deployed in proximity to the at least one crop are continuously obtained. The input sensor signals may be received from the at least one sensor, or may be retrieved from a database. The input sensor signals include at least input visual signals (e.g., input images) captured by at least one camera or other visual sensor deployed in proximity to the at least one crop. The input sensor signals may further include sensor signals indicating environmental parameters of a farm area including the at least one crop. A sensor may be deployed in proximity to a crop if, e.g., the sensor is deployed within a predetermined threshold distance or is otherwise able to capture signals accurately representing conditions of the at least one crop.

At S320, the input images are analyzed to at least determine at least one crop identifier. The at least one crop identifier may include, but is not limited to, a type of the at least one crop (e.g., whether the crop is a tomato plant, a cucumber plant, etc.), a current crop state of the at least one crop (e.g., growth stage such as, but not limited to, whether the crop is ready for harvesting), or both. In an embodiment, the analysis includes a machine vision analysis of the input images. In a further embodiment, the analysis may further include comparing results of the machine vision analysis of at least a portion of the input images to results of machine vision analysis of a plurality of reference images. Each reference image shows a particular type of crop, a crop in a particular crop state, or a combination thereof, and is associated with one or more dispersal routes.

At optional S330, input environmental sensor signals indicating environmental parameters of the farm area in which the at least one crop is grown are analyzed. The environmental variables may include, but are not limited to, a time of capture of each image, a location of the at least one crop, a temperature in the farm area, a radiation level at the farm area, wind speed, wind direction, humidity, and the like. In a further embodiment, S330 may include determining, based on the analysis of the input environmental sensor signals, environmental parameters for the at least one crop.

At S340, a dispersal route for irrigating the at least one crop is determined based on the analysis of the input sensor signals. The dispersal route includes dispersal parameters for irrigating the at least one crop via the irrigation system. To this end, the dispersal route may include, but is not limited to, flow rates, compositions of irrigation materials to be dispersed to the at least one crop, portions of the irrigation system 170 to disperse the irrigation compositions, a configuration of each dispersing portion of the irrigation system, and the like.

In an embodiment, S340 includes identifying a dispersal route associated with the determined type, current crop state, or both. In a further embodiment, the identified dispersal route may further be associated with the identified environmental parameters for the at least one crop. To this end, in an embodiment, S340 may further include comparing the determined type, current crop state, environmental parameters, or a combination thereof, to predetermined parameters associated with known dispersal routes. The determined dispersal route may be a best matching dispersal route selected from among the known dispersal routes. In yet a further embodiment, a matching score may be computed for each known dispersal route based on the comparison, where the determined dispersal route is the dispersal route having the highest matching score.

At S350, configuration instructions for configuring the irrigation system to implement the dispersal route are determined. The configuration instructions may include predetermined instructions associated with the dispersal route.

At S360, the determined configuration instructions are sent, in real-time, to an irrigation control system and execution continues with S310. The irrigation control system configures the irrigation system in accordance with the sent configuration instructions, thereby implementing the dispersal route in real-time.

Continuously capturing sensor signals and repeatedly determining new dispersal routes respective thereof allows for dynamic management of irrigation for the at least one crop. The dynamic management provides increased accuracy of the irrigation at least due to modifying irrigation plans in real-time as circumstances of the at least one crop change and comparing objective values to determine current crop states, thereby resulting in efficient consumption of irrigation materials (e.g., water, fertilizer, other fluids, etc.) and improved crop development.

It should be noted that FIG. 3 is depicted as including obtaining input sensor signals at step S310 merely for simplicity purposes and without limitation on the disclosed embodiments. In a typical embodiment, the input sensor signals are obtained continuously in parallel with execution of steps S330 through S360. New sensor signals may be analyzed and dispersal routes may be determined based thereon at each iteration of the method.

It should be noted that various embodiments described herein are discussed with respect to managing a single irrigation system merely for simplicity purposes and without limitation on the disclosed embodiments. The disclosed embodiments may be equally applied to control a plurality of irrigation systems without departing from the scope of the disclosure.

It should also be noted that various embodiments described herein are discussed with respect to analyzing images merely for simplicity purposes and without limitation on the disclosure. Videos and other visual content may be equally analyzed without departing from the scope of the disclosure. Such input videos and other visual content may be analyzed via machine vision techniques, and results of the analysis may be compared to results of analysis of reference videos or visual content.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for image-based irrigation system management, comprising:
continuously obtaining sensor signals, wherein the sensor signals include at least one first image showing at least one crop;
analyzing the obtained sensor signals, wherein the analysis includes performing machine vision on the at least one first image, wherein the analysis further includes comparing results of the machine vision to predetermined machine vision results of a plurality of second images, wherein each image of the plurality of second images is associated with a known crop state;
determining, based on the analysis, at least one current crop identifier of the at least one crop;

determining, in real-time, a dispersal route for an irrigation system based on the at least one current crop identifier; and causing configuration of the irrigation system based on the dispersal route, wherein the irrigation system irrigates the at least one crop according to the dispersal route when configured based on the dispersal route, wherein causing configuration of the irrigation system based on the dispersal route further comprises:

determining, based on the dispersal route, configuration instructions; and sending, to an irrigation control system, the configuration instructions, wherein the irrigation control system is configured to cause, in real-time, irrigation by the irrigation system based on the configuration instructions.

2. The method of claim 1, wherein the dispersal route includes at least one of: at least one flow rate, a composition of irrigation material to be dispersed to the at least one crop, at least one portion of the irrigation system to disperse a composition of irrigation material, and a configuration of at least one dispersing portion of the irrigation system.

3. The method of claim 1, wherein continuously obtaining the sensor signals further comprises:

capturing at least a portion of the sensor signals using at least one camera deployed in proximity to the at least one crop.

4. The method of claim 1, wherein the sensor signals further include at least one environmental sensor signal, wherein the analysis includes identifying at least one environmental parameter based on the at least one environmental sensor signal, wherein the dispersal route is determined based further on the at least one environmental parameter.

5. The method of claim 1, wherein each of the steps of analyzing the obtained sensor signals, determining the at least one current crop identifier, and determining the dispersal route is repeated at predetermined time intervals.

6. The method of claim 1, further comprising:

sending the dispersal route to a device equipped with a display, wherein the sent dispersal route is displayed on the device.

7. The method of claim 1, wherein the at least one crop identifier further includes a type of the at least one crop.

8. The method of claim 1, wherein the at least one current crop identifier includes a current crop state, wherein the current crop state is the known crop state of a matching second image of the plurality of second images.

9. A non-transitory computer readable medium having stored thereon instructions for causing a processing circuitry to execute a process, the process comprising:

continuously obtaining sensor signals, wherein the sensor signals include at least one first image showing at least one crop;

analyzing the obtained sensor signals, wherein the analysis includes performing machine vision on the at least one first image, wherein the analysis further includes comparing results of the machine vision to predetermined machine vision results of a plurality of second images, wherein each image of the plurality of second images is associated with a known crop state;

determining, based on the analysis, at least one current crop identifier of the at least one crop;

determining, in real-time, a dispersal route for an irrigation system based on the at least one current crop identifier; and causing configuration of the irrigation system based on the dispersal route, wherein the irrigation system irrigates the at least one crop according to the dispersal route when configured based on the dispersal route, wherein causing configuration of the irrigation system based on the dispersal route further comprises:

determining, based on the dispersal route, configuration instructions; and sending, to the irrigation control system, the configuration instructions, wherein the irrigation control system is configured to cause, in real-time, irrigation by the irrigation system based on the configuration instructions.

10. A system for image-based irrigation system management, comprising:

a processing circuitry; and a memory, the memory containing instructions that, when executed by the processing circuitry, configure the system to:

continuously obtain sensor signals, wherein the sensor signals include at least one first image showing at least one crop;

analyze the obtained sensor signals, wherein the analysis includes performing machine vision on the at least one first image, wherein the analysis further includes comparing results of the machine vision to predetermined machine vision results of a plurality of second images, wherein each image of the plurality of second images is associated with a known crop state;

determine, based on the analysis, at least one current crop identifier of the at least one crop;

determine, in real-time, a dispersal route for an irrigation system based on the at least one current crop identifier; and cause configuration of the irrigation system based on the dispersal route, wherein the irrigation system irrigates the at least one crop according to the dispersal route when configured based on the dispersal route, wherein causing configuration of the irrigation system based on the dispersal route further comprises:

determining, based on the dispersal route, configuration instructions; and sending, to the irrigation control system, the configuration instructions, wherein the irrigation control system is configured to cause, in real-time, irrigation by the irrigation system based on the configuration instructions.

11. The system of claim 10, wherein the dispersal route includes at least one of: at least one flow rate, a composition of irrigation material to be dispersed to the at least one crop, at least one portion of the irrigation system to disperse a composition of irrigation material, and a configuration of at least one dispersing portion of the irrigation system.

12. The system of claim 10, wherein the system is further configured to:

capture at least a portion of the sensor signals using at least one camera deployed in proximity to the at least one crop.

13. The system of claim 10, wherein the sensor signals further include at least one environmental sensor signal, wherein the analysis includes identifying at least one environmental parameter based on the at least one environmental sensor signal, wherein the dispersal route is determined based further on the at least one environmental parameter.

14. The system of claim 10, wherein the system is configured to analyze the obtained sensor signals, determine the at least one current crop identifier, and determine the dispersal route repeatedly at predetermined time intervals.

15. The system of claim 10, wherein the system is further configured to:
   send the dispersal route to a device equipped with a display, wherein the sent dispersal route is displayed on the device.

16. The system of claim 10, wherein the at least one crop identifier further includes a type of the at least one crop.

17. The system of claim 10, wherein the at least one current crop identifier includes a current crop state, wherein the current crop state is the known crop state of a matching second image of the plurality of second images.

18. The method of claim 1, wherein each of the plurality of second images is further associated with at least one dispersal route, wherein the determined dispersal route is one of the at least one dispersal route associated with one of the plurality of second images.

\* \* \* \* \*